Aug. 31, 1943.  T. R. THOREN ET AL  2,328,512
RIBBED DOME HOLLOW HEAD VALVE
Filed Aug. 30, 1940  2 Sheets-Sheet 1
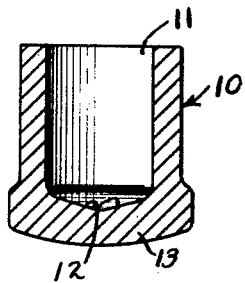
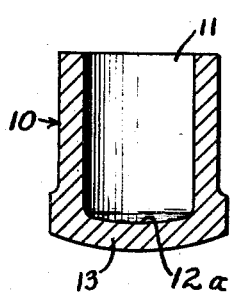
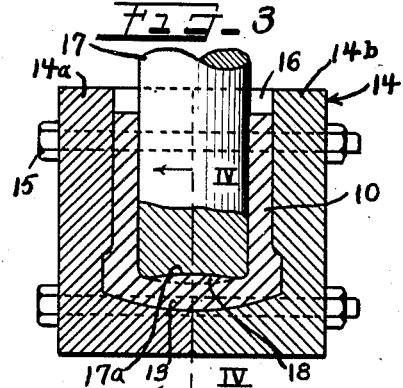
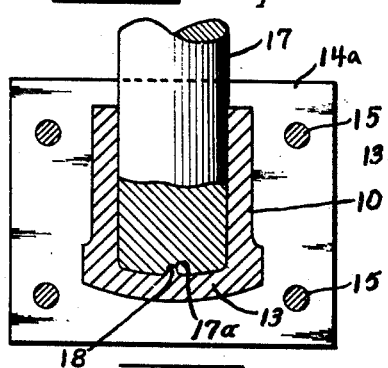
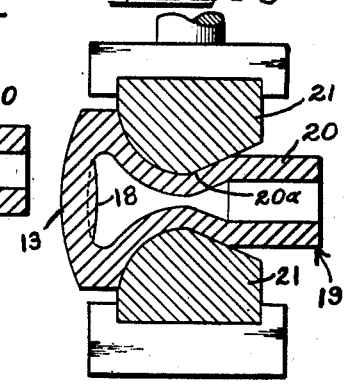
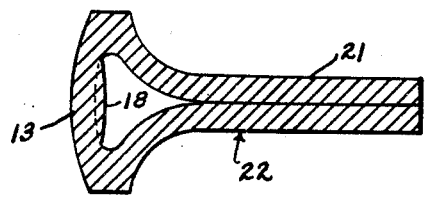
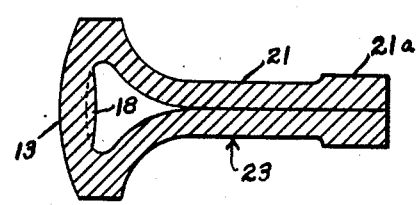
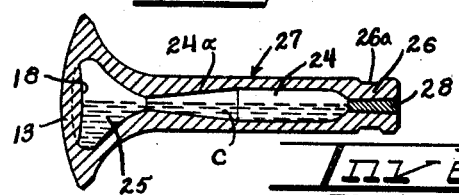
Inventors
Theodore R. Thoren.
Paul P. Johnson.
by Charles F. Hill Attys

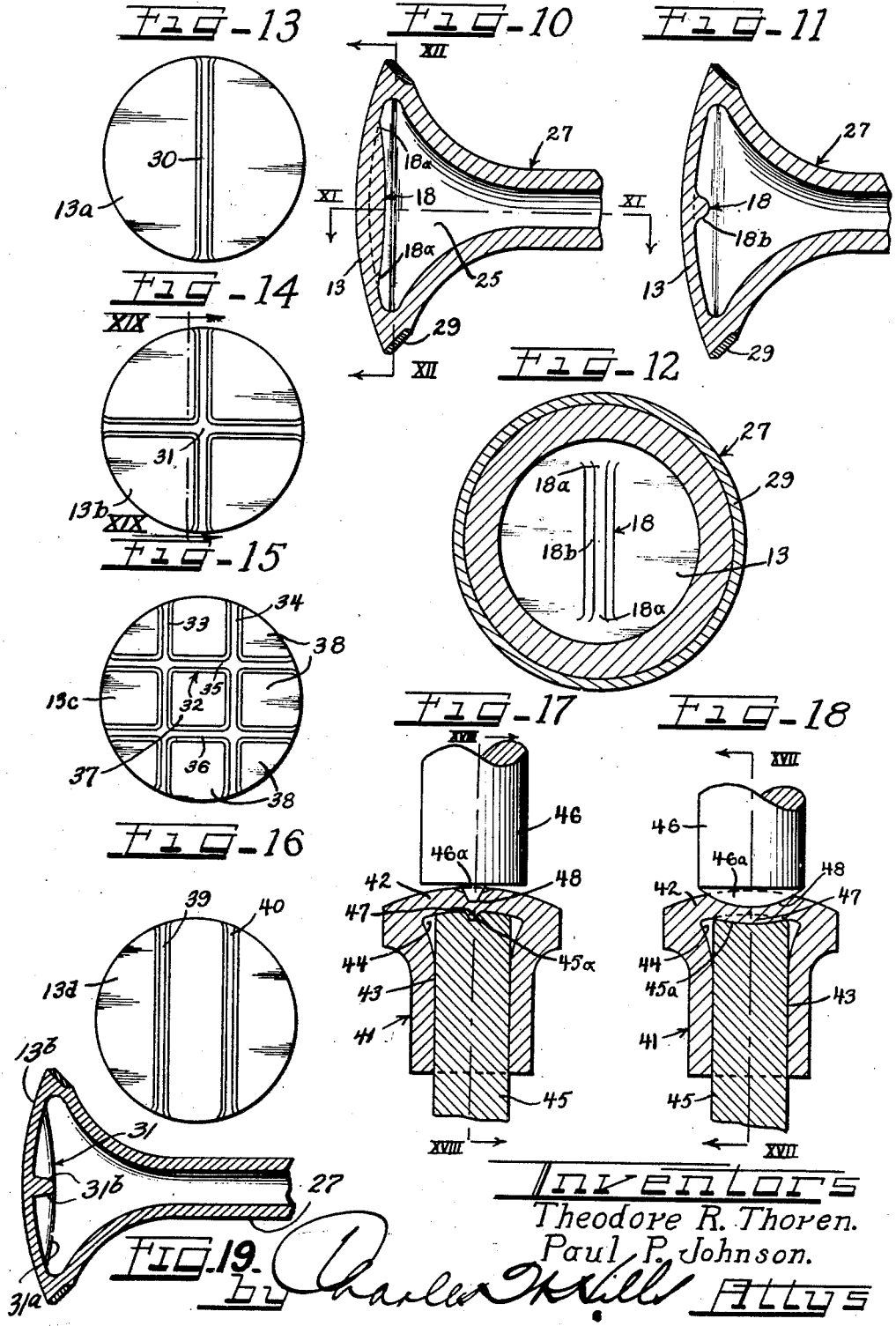
Aug. 31, 1943. T. R. THOREN ET AL 2,328,512
RIBBED DOME HOLLOW HEAD VALVE
Filed Aug. 30, 1940 — 2 Sheets-Sheet 2
Inventors
Theodore R. Thoren.
Paul P. Johnson.

Patented Aug. 31, 1943

2,328,512

UNITED STATES PATENT OFFICE 2,328,512

RIBBED DOME HOLLOW HEAD VALVE

Theodore R. Thoren and Paul P. Johnson, Cleveland, Ohio, assignors to Thompson Products Incorporated, Cleveland, Ohio, a corporation of Ohio Application August 30, 1940, Serial No. 354,778

5 Claims. (Cl. 123—188)

This invention relates to the reinforcing of hollow head valves.

More specifically the invention relates to the production of hollow poppet valves with one or more internal ribs formed on the dome of the valve head to better resist higher external pressures acting on the valve head.

Increasingly higher compression ratios, explosion pressures and motor temperatures in internal combustion engines are causing collapse of hollow head valves. This collapse usually occurs in the top wall or dome of the valve directly above the head cavity. While the domes of the valves could be made thicker to better resist the tremendous pressures to which they are subjected, the use of more metal in the valve head is undesirable for a number of reasons. For example, the resulting valves will be heavier, the heat retention in a thick, solid metal wall is greater than in a thin, solid metal wall, and the head cavity would have to be made smaller, thereby reducing the amount of coolant such as metallic sodium that could operate in the cavity for dispersing the heat away from the head of the valve.

According to the present invention, the heads of hollow poppet valves are stiffened by means of one or more internal ribs. These internal ribs are formed integrally on the inner wall of the valve head and act as a reinforcing strut for the dome of the valve to reinforce the same against collapse without, however, resulting in the disadvantages of a thick-walled dome. The ribs, according to this invention, are preferably formed by die pressure during the course of manufacturing the hollow poppet valve.

It is, then, an object of the invention to provide hollow head poppet valves with reinforcing ribs stiffening the valve heads.

A further object of the invention is to provide a hollow valve, having one or more internal ribs stiffening the dome thereof.

Another object of the invention is to increase the resistance of hollow valve heads against collapsing under external pressures by means of localized reinforcing ribs depending from the inner wall of the dome of the valve.

Another object of the invention is to provide hollow valves having increased resistance against collapsing by external pressures without increasing the thickness of the valve walls.

Another object of the invention is to form ribbed dome hollow head valves by die pressure operations.

A specific object of the invention is to provide integral ribs in the domes of hollow head valves composed of metal originally present in the wall of the dome.

Other and further objects of the invention will be apparent to those skilled in the art from the following detailed description of the annexed sheets of drawings which disclose preferred embodiments of the invention.

On the drawings:

Figure 1 is a vertical cross-sectional view taken through a metal billet forming a blank.

Figure 2 is a vertical cross-sectional view of the blank shown in Figure 1 after the interior of the blank has been machined.

Figure 3 is a vertical cross-sectional view with parts in elevation illustrating one method of forming a rib on the dome of the blank shown in Figure 2.

Figure 4 is a vertical cross-sectional view, with parts in elevation, taken along the line IV—IV of Figure 3.

Figure 5 is an axial cross-sectional view of a partially formed valve body made from the blank shown in Figures 3 and 4.

Figure 6 is a vertical cross-sectional view, with parts in elevation, showing a swaging operation for necking down the valve body shown in Figure 5.

Figure 7 is a vertical cross-sectional view of a valve body formed from the body shown in Figure 6 and having a solid or collapsed stem portion.

Figure 8 is a view similar to Figure 7 but illustrating an enlarged upset end portion on the stem.

Figure 9 is a vertical cross-sectional view of a finished hollow valve made from the body illustrated in Figure 8.

Figure 10 is a fragmentary longitudinal cross-sectional view of a rib dome valve according to this invention.

Figure 11 is a cross-sectional view taken along the line XI—XI of Figure 10.

Figure 12 is a cross-sectional view taken along the line XII—XII of Figure 10.

Figures 13 to 16 inclusive are inside face views of various types of ribbed domes for valve heads obtainable according to this invention.

Figure 17 is a vertical cross-sectional view taken along the line XVII—XVII of Figure 18 illustrating another method of forming an internal rib in the dome of a hollow head valve body.

Figure 18 is a cross-sectional view, with parts in elevation, taken along the line XVIII—XVIII of Figure 17.

Figure 19 is a cross-sectional view taken along the line XIX—XIX of Figure 14.

As shown on the drawings:

In Figure 1 the reference numeral 10 designates generally a blank formed from a solid metal slug by piercing the same to form therein a blind bore 11 having an inclined blind end 12. A dome head 13 of increased diameter is also formed on the blank. While the blank 10 is preferably formed by piercing or forging operations, it should be understood that the same can be cast into the form shown in Figure 1.

In Figure 2 the blank 10 is shown in a machined state wherein the bore 11 is machined to provide a blind end 12a of a flatter contour than that originally present at 12 in the pierced blank. The shallow concave contour 12a is substantially maintained during the entire process of fabricating the valve.

In Figures 3 and 4 the machined blank 10 is illustrated as mounted in a die 14 formed in two half-sections 14a and 14b held together by means of bolts such as 15 and, when bolted together, defining a cavity 16 having the contour of the machined blank 10 and snugly receiving the blank therein as shown. A plunger 17 having a grooved end 17a is forced into the bore 11 of the blank 10 and pressed against the head 13 of the blank under great pressure to cause metal to flow from the head into the groove 17a of the plunger and thus produce a rib 18 across the inner face of the domed valve head. This rib 18 stiffens the dome and reinforces the same against collapsing by external pressures.

The ribbed blank is then removed from the die 14 and subjected to alternate swaging and extrusion operations for forming a valve body 19 shown in Figure 5. The valve body 19 has a partially formed stem portion 20 of reduced diameter. The valve body 19 is next subjected to a necking down swaging operation as shown in Figure 6 wherein the stem portion adjacent the head 13 is necked down as at 20a by means of swaging dies 21. The necked down valve body 19 is next subjected to extrusion operations which reduce and collapse the necked down stem portion 20 into a solid reduced stem 21 of reduced diameter as shown in Figure 7. The valve body 22 thus produced has a solid stem 21 and a hollow head 13. The end of the solid stem 21 is next upset as shown at 21a in Figure 8 to provide a thickened portion thereon.

The valve body 23 of Figure 8 is next machined and axially drilled to produce the finished valve 27 shown in Figure 9. The stem portion 21 of the body 23 is drilled to provide the bore 24 having a tapered end 24a communicating with the cavity 25 in the head 13 of the valve. The thickened portion 21a of the blank 23 is pressed in to close the open end of the bore 24 as at 26 and the closed portion is then bored to receive a sealing plug 28. Metallic sodium or other coolant C is placed in the cavity provided by the bores 24, 24a and the head cavity 25, and is sealed in these cavities by means of the plug 28. An annular groove 26a is provided around the end of the stem for receiving a valve spring retainer.

The finished valve 27 shown in Figure 9 thus has a hollow stem and head and the dome of the head has an internal rib 18 extending thereacross to resist collapsing forces applied externally on the dome.

The valve 27, as best shown in Figures 10 to 12, has a comparatively thin domed head 13 and this thin head is reinforced by the internal rib 18 which bridges a substantial portion of the dome between the side walls. This bridging rib so greatly stiffens the dome that very thin walls can be used in the dome.

The valve head is preferably grooved around the side periphery thereof to receive bearing ring 29. This ring 29 serves as the seat for the valve and can be made of a wear-resisting alloy different from the metal making up the valve body. The ring 29 can be welded in the groove around the valve head or can be puddled from molten metal into this groove.

As shown in Figure 10, the rib 18 is longitudinally curved and merges at its ends 18a into the dome head 13 with a gently curved contour. The rib 18 does not extend to the sides of the valve head cavity 25. As shown in Figures 11 and 12, the rib 18 is also curved in transverse cross section to provide a somewhat rounded contour 18b. This transverse contour readily lends itself to die pressure formation and at the same time gives a very efficient stiffening effect to the rib.

In Figures 13 to 16, the reference numerals 13a, 13b, 13c and 13d represent the inner faces of valve heads or domes similar to the heads or domes 13 described in Figures 1 to 12. The dome 13a in Figure 13 has a single rib 30 integrally formed thereon and depending into the interior of the valve across the entire dome or head. In other words, the rib 30 differs from the rib 18 in that it bridges the entire span of the dome from side to side and through the center of the head. The rib 30 preferably has the general transverse contour 18b of the rib 18 and can, if desired, be longitudinally curved like the rib 18 to merge into the side walls of the valve along a gently sloping line.

In Figure 14 the valve head or dome 13b is provided with a rib 31 in the shape of a Greek cross. This rib 31 has four legs of equal length merging in the exact center of the dome and extending to the side walls of the valve. The rib 31 can be transversely shaped as at 31b (Figure 19) like the rib 18 and the legs of the rib 31 can also be curved longitudinally as at 31a (Figure 19) like the rib 18.

In Figure 15 the valve head or dome 13c is provided with a rib 32 of checkerboard design. In other words the rib 32 has parallel legs 33 and 34 intersecting with another pair of parallel ribs 35 and 36 at right angles to the first mentioned pair. The ribs 33, 34, 35 and 36 are equally spaced from the center of the dome 13c and a square such as 37 is thus provided in center of the valve dome bounded by square segments 38. The extremities of the ribs 34 to 36 merge into the side walls of the valve and each rib can have a transverse contour similar to the contour 18b of the rib 18.

In Figure 16 the valve head or dome has two parallel ribs 39 and 40 equally spaced from the center of the dome and bridging the entire span of the dome.

The forms of ribs shown in Figures 13 to 16 can be made in the same manner illustrated in Figures 3 and 4 merely providing the plunger 17 with a groove or grooves capable of producing the illustrated patterns in Figures 13 to 16.

In order to extend the ribs to the side walls of the valve head, the groove in the plunger 17 would be extended to the outer periphery of the plunger.

In Figures 17 and 18 there is illustrated another method of forming a rib on the head or dome of a valve body. In Figures 17 and 18 the reference numeral 41 designates generally a forged valve body having a domed head portion 42, a pierced cylindrical cavity 43, and an enlarged head cavity 44. The body 41 differs from the blank 10 shown in Figures 1 and 2 in that the head cavity 44 is already formed larger than the cavity or bore 43. The body 41 compares generally with the body 19 shown in Figure 5 prior to the last forging operation which further reduced the stem portion 20.

The body 41 is seated on a stationary punch 45 having a rib forming groove 45a in the upper end thereof. The end of the punch having the groove 45a therein receives the dome 42 of the body thereon.

A movable punch 46 having a tongue 46a projecting from the lower end thereof is forced down on top of the dome 42 with the tongue 46a in alignment with the groove 45a of the stationary punch. The tongue 46a then moves metal in the dome or head into the groove 45a of the stationary punch to form a rib 47 similar to the rib 18 described above in connection with Figures 3 to 12.

Since the valve head cavity 44 is larger than the cavity 43 the rib 47 formed by this movable and stationary punch method cannot extend to the side walls of the valve head inasmuch as the stationary die 45 must be small enough to fit through the smaller cavity 43.

The tongue 46a of the movable plunger 46 will leave a recess 48 in the outer wall of the valve head but this can be removed in subsequent manufacturing operations. For example, the head of the body 41 can be sufficiently thick at this stage of the valve forming operation so that metal can be removed to a depth greater than the depth of the recess 48 thus leaving a smooth unbroken surface on top of the body.

In the process illustrated in Figures 3 and 4, the rib portion of the valve head is actually thicker than the rest of the head wall since the enveloping die 14 for the valve blank permits gathering of the metal to form the rib, whereas in the method illustrated in Figures 17 and 18 the metal is only pushed into the groove of the stationary plunger to form the rib. However if the head metal is then removed down to the bottom of the recess 48, the rib portion of the resulting valve will be thicker than the rest of the head wall.

From the above descriptions it should be understood that this invention now provides for the stiffening and strengthening of the heads or domes in hollow poppet valves by adding a minimum of metal in the valve head. The ribbed hollow head valves of this invention can thus be made with the usual thin walls and at the same time the valves will resist greater external pressures than heretofore. The inwardly projecting ribs formed on the valve heads or domes according to this invention have a secondary function of providing an increased area on which the coolant in the valve can act so that heat transfer between the valve head and the coolant is enhanced.

It will, of course, be understood that various details of construction may be varied through a wide range without departing from the principles of this invention and it is, therefore, not the purpose to limit the patent granted hereon otherwise than necessitated by the scope of the append claims.

We claim as our invention:

1. In a poppet valve having a hollow dome-shaped head the improvement which comprises an integral localized reinforcing rib depending inwardly from the head and diminishing in depth from the central portion of the head to the outer portion thereof.

2. In a hollow head poppet valve the improvement which comprises an integrally formed rib on said head projecting into the head cavity and passing through the center of the valve head, said rib having a rounded transverse cross-sectional contour and a gently curved longitudinal contour merging at its ends into the valve head and having its thickest portion at the center of the valve head.

3. In a hollow head metal poppet valve the improvement of a relatively thin metal end wall for said hollow head having a worked integral localized elongated inwardly offset portion defining an internal stiffening rib in the hollow head composed of metal displaced from said end wall.

4. In a hollow head metal poppet valve, the improvement of an end wall for said hollow head having an integral elongated inwardly offset portion defining an internal stiffening rib structure.

5. In a hollow head metal poppet valve, the improvement of an end wall for said hollow head having an integral elongated inwardly offset portion defining an internal stiffening rib structure, said rib structure being formed cruciform so as to provide most reenforcement at the central portion of said wall.

THEODORE R. THOREN.
PAUL P. JOHNSON.